Figure 3:
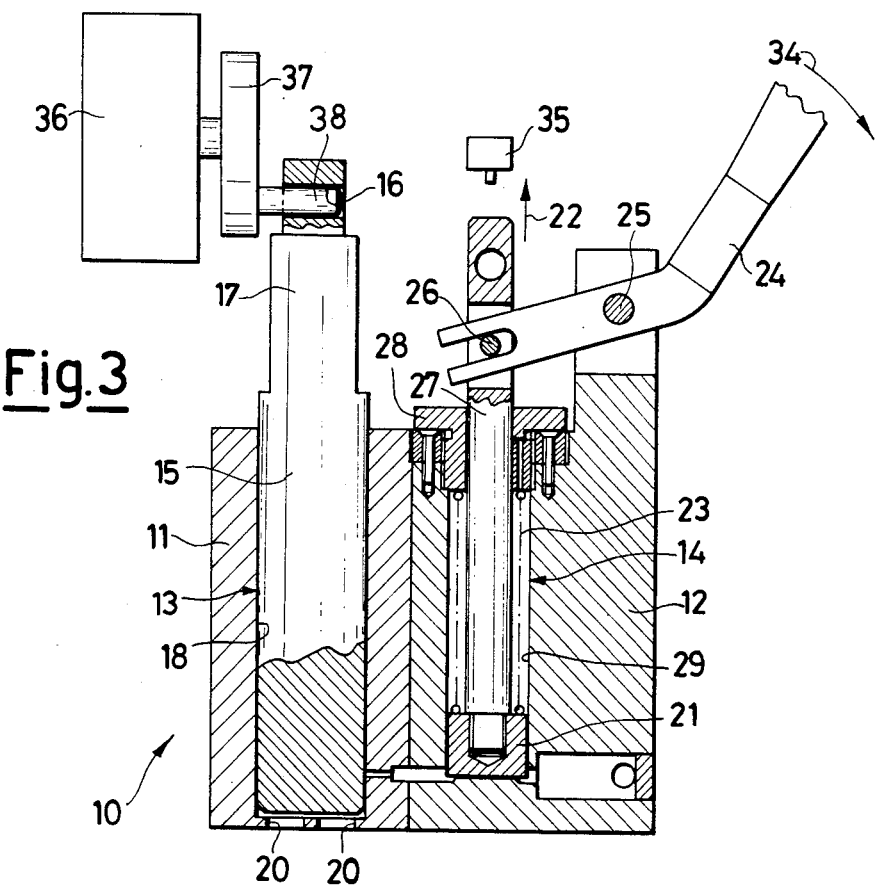

United States Patent [19]

Carnisio

[11] Patent Number: 4,643,335
[45] Date of Patent: Feb. 17, 1987

[54] DELIVERY UNIT FOR ICE CREAMS GARNISHED WITH FLOWING MATERIAL

[76] Inventor: Umberto Carnisio, Via XXV Aprile, 71, 28066 Galliate (Novara), Italy

[21] Appl. No.: 719,989

[22] Filed: Apr. 4, 1985

[30] Foreign Application Priority Data

Apr. 13, 1984 [IT] Italy ............................... 21540/84[U]

[51] Int. Cl.⁴ .............................................. B67D 5/52
[52] U.S. Cl. .................................. 222/135; 222/255; 222/333; 222/145
[58] Field of Search .............. 222/255, 256, 260, 262, 222/263, 135, 145, 372, 380, 340, 333; 417/254, 265; 62/390

[56] References Cited

U.S. PATENT DOCUMENTS

| | | | |
|---|---|---|---|
| 2,941,854 | 6/1960 | Jernarder | 222/256 |
| 3,276,633 | 10/1966 | Rahauset | 222/145 |
| 3,332,583 | 7/1967 | Lewis | 222/255 |
| 3,487,782 | 1/1970 | Henrotte | 222/255 |
| 3,934,427 | 1/1976 | Keyes | 222/135 |
| 4,004,717 | 1/1977 | Warke | 222/255 |

FOREIGN PATENT DOCUMENTS 1054452 1/1967 United Kingdom ............... 222/255

Primary Examiner—H. Grant Skaggs
Attorney, Agent, or Firm—Shlesinger, Fitzimmons, Shlesinger

[57] ABSTRACT

A delivery unit for ice creams of the type including at least a first piston pump supplied by at least one ice cream producing assembly, wherein the cylinder of the piston pump, in the portion corresponding to the end part of the supply stroke of the piston, is connected through a radial port to the delivery side of at least one second pump. Said second pump sucks a flowing ice cream garnishing material from a suction conduit controlled by a check valve, the sucking operation taking place when the first pump is in a position in which its piston obstructs the radial port, the piston stroke of the second pump being controlled, during the sucking operation, against the action of a counteracting device.

4 Claims, 4 Drawing Figures

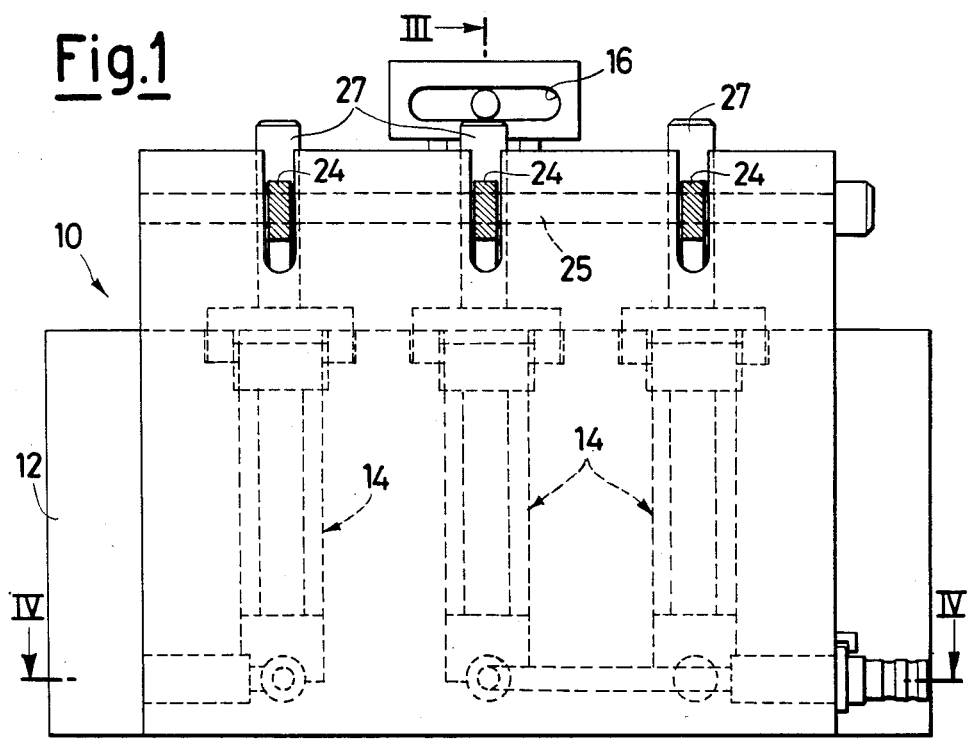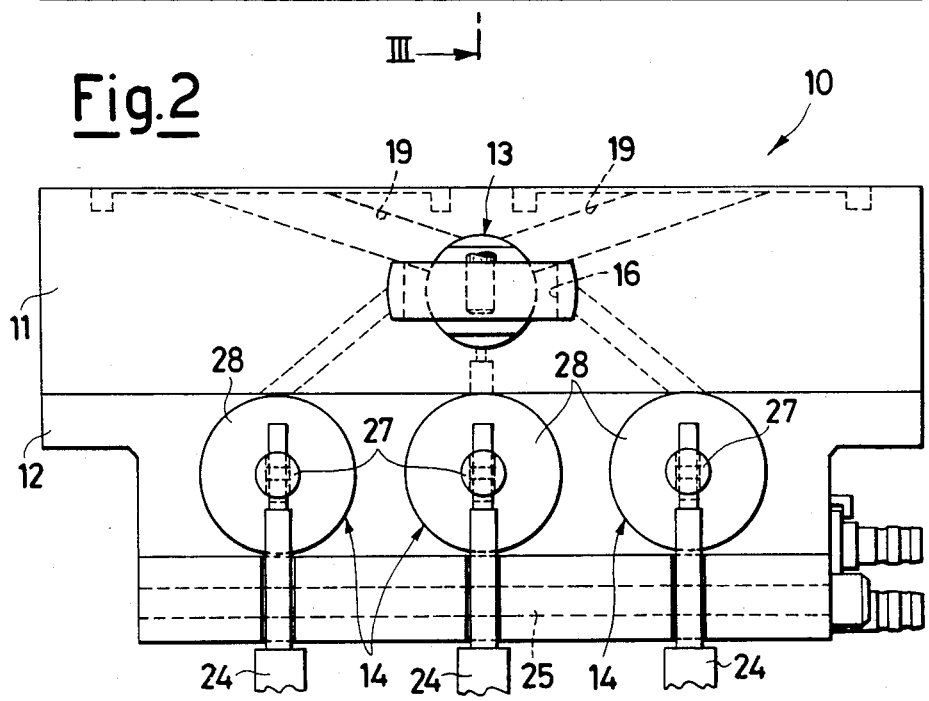

DELIVERY UNIT FOR ICE CREAMS GARNISHED WITH FLOWING MATERIAL

The present invention relates to an improved delivery unit for ice cream machines having the new peculiar characteristic to be able to deliver in the same operating cycle a desired quantity of ice cream garnished with a different flowing material, e.g. a syrup, even of various tastes.

Delivery units of the above type are known, they however suffer from complicated and costly arrangements of parts in order to provide the ice cream with a garnish, which is typically a dense syrup. For example, the application of the syrup is obtained by means of pressure vessels for the syrup separated from the ice cream delivery head.

The object of this invention is to provide a unit of very simple structure and very effective in operation, suitable also for fitting existing machines.

The delivery unit of the invention is of the type including at least a first piston pump supplied by at least one ice cream producing assembly and is characterized in that the cylinder of said piston pump, in the portion corresponding to the end part of the supply stroke of said piston, is connected through a radial port to the delivery side of at least one second piston pump, said pump sucking a flowing ice cream garnishing material from a suction conduit controlled by a check valve, said sucking operation taking place when said first pump is in a nonoperative position with its piston obstructing said radial port, the piston stroke of said second pump being controlled, during the sucking operation, against the action of counteracting means.

Preferably said first pump is selectively supplied by a plurality of ice cream producer assemblies, and a plurality of garnishing material supply pumps can be connected to said first pump. Preferably the suction stroke of the piston of the second pump delivering the garnishing material is manually controlled by means of a lever, whereas the delivery stroke of said piston is automatically controlled by said counteracting means when the piston of said first pump is displaced during the operating period and is clearing said radial port.

The structural characteristics and the advantages of the invention will become apparent from the following description taken together with the accompanying schematic drawings showing a practical embodiment of the invention.

Figure 4:
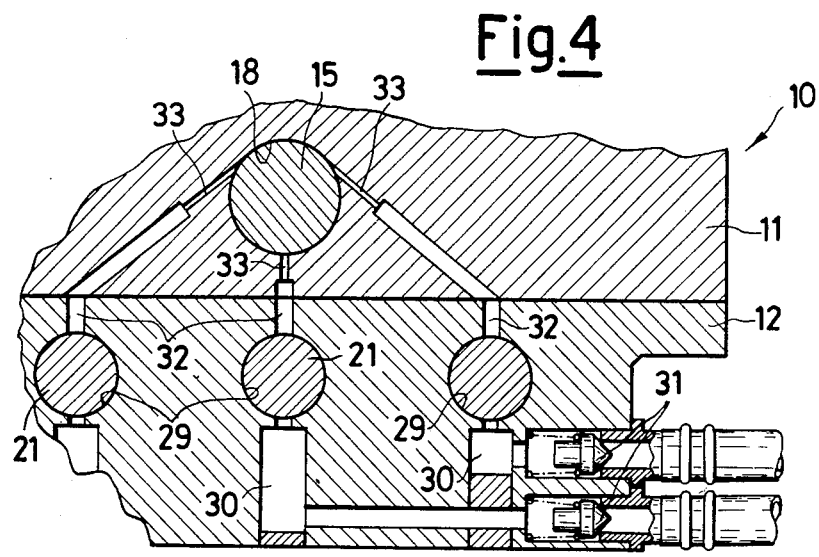

In the drawings:
FIG. 1 is a plan view;
FIG. 2 is an elevation view;
FIG. 3 is a section view along the line III—III of FIG. 1, and
FIG. 4 is a section view along the line IV—IV of FIG. 1.

Referring to the drawings, the ice cream delivery unit of the invention is generally indicated with the reference numeral 10, and in the example shown is comprised of two blocks 11,12 mutually coupled and including, respectively, one ice cream delivery pump 13 and three pumps 14 for selectively delivering three garnishing materials of different tastes, for example syrup.

The pump 13 is of the positive displacement type with a piston 15, and the piston stroke can be controlled by means known per-se in this type of devices, e.g. by means of a kinematic chain comprised of a motor 36 which causes a rotation of a cam 37 which is provided with an eccentric pin 38 linked slidingly free to the slider 16 fixed to the stem 17. A pair of radial conduits 19 for delivering two ice creams of different tastes prepared upstream by means of a known equipment (not shown) open into the chamber 18 of the piston 15. The chamber 18 is further provided with an aperture 20 for delivering the garnished ice cream, said aperture 20 having for example a star shape.

Each pump 14 is also of the positive displacement type with a piston 21. The movement of the piston 21 in the direction of arrow 22 is counteracted by a spring 23 and can be manually controlled by means of a lever 24; said lever 24 is pivotally engaged in 25 with the block 12 and is loosely linked at 26 to the stem 27 of piston 21. A threaded locking ring 28 permits to set the pushing force of spring 23 and therefore the pressure caused by the piston 21. A radial suction conduit 30 opens into chamber 29; said conduit 30 is provided with a check valve 31 and permits the suction of the ice cream garnishing material contained in a reservoir (not shown). Said chamber 29, in a position diametrically opposed to the suction conduit 30, is provided with a delivery conduit 32 leading through a passage 33 of reduced diameter to the chamber 18 of the pump 13. The outlet of passage 33 is located near the apertures 20 delivering the ice cream, in the portion of the chamber wall swept by the piston in the end part of its delivery stroke.

The operation of the above delivery unit is briefly as follows.

At the beginning of the operating cycle, the equipment is in the state as illustrated in FIG. 3, that is with piston 15 obstructing the delivery sides 32–33 of pumps 14, with said pumps at rest. Starting of the operating cycle is caused by actuating the pump or the pumps 14 corresponding to the selected taste or tastes of the garnishing material, by means of rotation of the lever or levers 24 in the direction of arrow 34.

In consequence, piston 21 which is counteracted by the spring 23, performs the suction stroke causing the filling of chamber 29 by the selected garnishing material. Piston 21 remains in the position thus reached even when lever 21 is no more actuated, since delivery is hindered by the obstruction of passages 33 by piston 11 and check valve 31. At completion of the suction stroke of piston 21 (top dead centre), the stem 27 causes energization of an electric circuit schematically indicated by the reference numeral 35. Said electric circuit causes a timed rotation of the electric motor 36, and therefore a rotation of cam 37 and actuation of pump 13. Chamber 18 is thus filled with the ice cream of the desired taste by means of the displacement of piston 15 in the pump 13. Delivery of the ice cream is effected through conduit 19. Piston 15 on return in the position of FIG. 3 will cause delivery through the apertures 20 of the desired quantity of ice cream intermingled with the garnishing material or material arriving from preset passages 33 which have been previously opened by piston 15. Consequently spring 33 is enabled to return spontaneously piston 21 in the initial position, thus supplying chamber 18 with the garnishing material.

The setting of spring 23 permits to obtain the desired discharge of the garnishing flowing material as a function of the preset dimensions of the passages 33 and the viscosity of the syrup. Delivery of syrup will be stopped however as piston 15 reaches its lowermost position, thus obstructing the apertures 33 and avoiding dripping of residual syrup.

It should of course be understood that the above described unit can be implemented with numerous changes, without departing from the spirit and scope of the invention, and also the control units, both manually and motor driven, for all moving elements can have any different suitable configuration.

I claim:

1. A delivery unit for ice creams of the type including at least a first piston pump having a first piston reciprocable in a chamber which has an inlet end connected to at least one ice cream producing assembly to receive ice cream therefrom, and which has an outlet end to discharge ice cream therefrom, characterized in that the cylinder defining said chamber of said first piston pump, in the portion thereof adjacent to the discharge end of said chamber, is connected through a radial port to the delivery side of at least one second pump, means for operating said second pump to effect sucking a flowing ice cream garnishing material from a suction conduit controlled by a check valve into the piston chamber of said second pump while the piston in said first pump is in a position in which it obstructs said radial port, and counteracting means operable by the stroke of the piston in said second pump in one direction during the sucking operation thereof to initiate the reciprocation of said first piston.

2. A delivery unit according to claim 1, including means connecting said first pump selectively to a plurality of ice cream producer assemblies, and a plurality of garnishing material supply pumps connected to said first pump.

3. A delivery unit according to claim 1, characterized in that the suction stroke of the piston of the second pump delivering the garnishing material is manually controlled by means of a lever, whereas the stroke of said first piston is automatically controlled by said counteracting means.

4. A delivery unit according to claim 1, including means operative to move said piston in said second pump in the opposite direction to effect delivery of garnishing material through said radial port to said chamber in the cylinder of said first pump, during the movement of said first piston toward the inlet end of said chamber.

* * * * *